US007901281B2

(12) United States Patent
Breslo

(10) Patent No.: US 7,901,281 B2
(45) Date of Patent: Mar. 8, 2011

(54) METHOD OF PLAYING MULTI-BET PRINTED TICKETS

(75) Inventor: James Breslo, Pacific Palisades, CA (US)

(73) Assignee: Diamond Game Enterprises, Inc., Chatsworth, CA (US)

( * ) Notice: Subject to any disclaimer, the term of this patent is extended or adjusted under 35 U.S.C. 154(b) by 0 days.

(21) Appl. No.: 12/718,354

(22) Filed: Mar. 5, 2010

(65) Prior Publication Data

US 2010/0160024 A1 Jun. 24, 2010

Related U.S. Application Data

(63) Continuation of application No. 10/979,729, filed on Nov. 2, 2004, now Pat. No. 7,695,360.

(51) Int. Cl.
*A63F 9/24* (2006.01)
*A63F 13/00* (2006.01)

(52) U.S. Cl. ............ 463/17; 463/25; 463/29; 273/138.1; 273/139

(58) Field of Classification Search .............. 463/16-20, 463/25, 29; 273/138.1, 139; 283/903
See application file for complete search history.

(56) References Cited

U.S. PATENT DOCUMENTS 5,219,167 A 6/1993 Hamano
5,348,299 A 9/1994 Clapper, Jr.
5,735,432 A * 4/1998 Stoken et al. .................... 221/1
5,941,771 A 8/1999 Haste, III
6,048,269 A 4/2000 Burns et al.
6,254,480 B1 7/2001 Zach
6,537,150 B1 * 3/2003 Luciano et al. ................ 463/16
6,648,755 B1 11/2003 Luciano, Jr. et al.
6,676,522 B2 1/2004 Rowe et al.
7,695,360 B2 * 4/2010 Breslo ............................ 463/17

OTHER PUBLICATIONS

"About Pull-Tab Games," printout from Michigan lottery web site: http://www.michigan.gov/printerFriendly/0,1687,7-110-29196_29200_30354-79037—,00.html, Release Date: Oct. 27, 2003, printout date: Nov. 1, 2004, 1 page.

Pull-Tabs, printout from Pull-Tabs.com web site: http://www.pull-tabs.com/pulltabs.htm, printout date: Feb. 5, 2004, Copyright© 2003 Kardwell International, Inc., 2 pages.

Pull-Tab dispensers, printout from Pull-Tabs.com web site: http://www.pull-tabs.com/dispenser.htm, printout date: Feb. 5, 2004, Copyright© 2003 Kardwell International, Inc., 3 pages.

How to Play—The Official Web site of the Missouri Lottery, printout from web site: http://www.molottery.state.mo.us/aboutourgames/howtowin/pulltabs/pulltabs_howtoplay.shtm, printout date: Feb. 2, 2004.

(Continued)

*Primary Examiner* — Melba Bumgarner
*Assistant Examiner* — Jasson H Yoo
(74) *Attorney, Agent, or Firm* — Panitch Schwarze Belisario & Nadel LLP

(57) ABSTRACT

Preprinted game tickets, such as pull tab tickets or instant game lottery tickets, are dispensed from a vending machine. Instead of having a fixed cost and a fixed prize amount, the game tickets may be purchased at different bet levels and credit values, both of which change the cost and prize amount. Buy-a-pay payments are also provided to buy additional symbol combinations.

43 Claims, 7 Drawing Sheets

OTHER PUBLICATIONS

Pull-Tabs—The Official Web site of the Missouri Lottery, printout from web site: http://www.molottery.state.mo.us/aboutourgames/howtowin/pulltabs/pulltabs.shtm, printout date: Feb. 3, 2004, 7 pages.

Cool Cash Instant Pull Tab Ticket, printout from Kansas Lottery web site: http://www.kslottery.com/PullTabGames/EmptyTheVault238.html, printout date: Feb. 3, 2004, 1 page.

$1,000 Jackpot Instant Pull Tab Ticket, printout from Kansas Lottery web site: http://www.kslottery.com/PullTabGames/$1000Jackpot220.html, printout date: Feb. 3, 2004, 1 page.

Lucky Tab II Series, printout from Diamond Game Enterprises, Inc. web site: http://www.diamondgame.com/prod_luckytab2.asp, printout date: Nov. 1, 2004, 2 pages.

Lucky Tab II MilleniumSeries, printout from Diamond Game Enterprises, Inc. web site: http://www.diamondgame.com/news.asp?newsID=4&flag=1, original article from Indian Gaming, Aug. 2002, web site printout date: Nov. 1, 2004, 2 pages.

Bill Burton, "How to Read a Slot Machine," printout from web site: http://casinogambling.about.com/library/weekly/aa080999.htm, printout date: Jul. 17, 2003, 4 pages.

* cited by examiner

FIGURE 1
TICKET 1 (FRONT)
692 1A2 95D
000621 19037
70904311A0918
TICKET 1 (BACK)
000621
19037
000002
TICKET 2 (FRONT)
459 23C 62B
000621 19032
70904311A0918
TICKET 2 (BACK)
000621
19032
000002

DEAL

Tab results

| Tab # | Tab 1 | Tab 2 | Tab 3 |
|---|---|---|---|
| 1 | lose | lose | lose |
| 2 | lose | lose | lose |
| 3 | lose | lose | $1 winner |
| 4 | lose | lose | lose |
| 5 | $5 winner | $10 winner | lose |
| 6 | lose | lose | lose |
| 7 | lose | lose | lose |
| 8 | lose | lose | lose |
| 9 | lose | lose | lose |
| 10 | lose | lose | lose |

FIGURE 3

FIGURE 5

| Tab # | Dispensed? | Redeemed? | Redemption Location[1] |
|---|---|---|---|
| 1 | Y | Y | VM |
| 2 | Y | Y | VM |
| 3 | Y | N | |
| 4 | Y | N | |
| 5 | Y | N | |
| 6 | Y | N | |
| 7 | Y | Y | VM |
| 8 | Y | Y | VM |
| 9 | Y | Y | CS |
| 10 | Y | Y | CS |
| 11 | N | N | |
| 12 | N | N | |
| . . . | . . . | . . . | . . . |
| n | N | N | |

[1] VM = vending machine
CS = cashier station

WIN TABLE

| CREDITS PLAYED | WINNING TICKET COMBINATIONS | CREDITS WON* |
|---|---|---|
| 1 | S1 S1 S1 | 5 |
| 2 | S1 S1 S1 | 5 |
| | S2 S2 S2 | 20 |
| 3 | S1 S1 S1 | 5 |
| | S2 S2 S2 | 20 |
| | S3 S3 S3 | 100 |

S=SYMBOL

* FOR BASE CREDIT VALUE

FIGURE 7

METHOD OF PLAYING MULTI-BET PRINTED TICKETS

CROSS-REFERENCE TO RELATED APPLICATIONS

This application is a continuation of copending U.S. application Ser. No. 10/979,729 filed Nov. 2, 2004, the entire disclosure of which is incorporated herein by reference.

BACKGROUND OF THE INVENTION

There are many different types of game tickets known in the art. One conventional type of game ticket is associated with a pull-tab (pull tab) game. In a pull tab game, a set of game tickets, often referred to as a "deal of tabs," is created. There are a fixed amount of wins in each deal. The type and amount of wins are used to create the content of the pull tab tickets. A typical two-ply pull tab ticket has multiple tabs (windows) per game ticket that are initially hidden. Upon purchase, a player uncovers each of the pull tabs to determine if the ticket is a winner. A winning pull tab ticket may require the presence of a combination of symbols (similar to a slot machine), or the presence of a winning symbol under a single pull tab. Machines have been created to automatically dispense and even validate pull tabs. See, for example, U.S. Pat. No. 5,941,771 (Haste, III) and U.S. Pat. No. 5,348,299 (Clapper, Jr.), both of which are incorporated by reference herein. One commercially sold pull tab machine is the Lucky Tab II machine, available from Diamond Game Enterprises, Inc., Chatsworth, Calif.

Single-ply pull tab tickets also exist. Single-ply pull tab tickets have at least one game region with game content similar to the content of a pull tab game, but with no pull tab structure. One example of prior art single-ply pull tab tickets is shown in FIG. 1. (The tickets in FIG. 1 are part of the same deal of tickets.) In these tickets, different strings of alphanumeric characters represent different symbols, such as the symbols shown in FIG. 4 of U.S. Pat. No. 5,348,299. The form factor of the tickets in FIG. 1 allow for an extremely large number of tickets to be dispensed from a single reel of tickets, while allowing the ticket contents to be automatically read and displayed using the bar code reader and display screen in the machine described in U.S. Pat. No. 5,348,299.

Conventional pull tab tickets are sold in fixed denominations, typically ranging from $0.25 to $2.00 with award (prize) amounts ranging from the cost of the ticket to $5,000. Most of the prize amounts are small multiples of the ticket price. The average chance of winning for any particular ticket typically ranges from about 1 in 5 to about 1 in 7, but other ratios are known in the art.

Electronic pull tab machines also exist. These machines are electronically loaded with one or more electronic "digital deals" (i.e., an electronic version of a set of physical tickets). Unlike a lottery terminal or slot machine, the electronic pull tab machine does not select the outcome. It merely dispenses the set of tickets which have predetermined content that provides a predetermined outcome. The electronic pull tabs are dispensed in a previously determined order, such as sequentially. A touch screen is often provided on such machines. Upon receipt of payment, a pull tab appears on the touch screen and the player touches each tab or window to reveal its hidden content. Another type of electronic pull tab machine uses spinning reels which simulate physical reels that display tab results upon stopping. A receipt is printed if the electronic pull tab ticket is a winner. When all of the pull tabs in each available deal are sold, new digital deals must be electronically loaded into the machine to allow for continued play. One example of a touch screen electronic pull tab machine that dispenses "digital pull tabs" is commercially available from Tekbilt USA, Huntingdon Valley, Pa. The digital deal is loaded into the Tekbilt USA machine using a floppy disk and security key.

A "multiplier" or "multi-pay" feature is provided on some gaming machines, such as slot machines. In the context of a slot machine that has a predetermined payout for getting a certain symbol combination, the number of coins (credits) played multiplies the payout. For example, if the slot machine pays 5 credits for getting three lemons when you play one credit, it would pay 10 credits for the second credit and 15 credits for playing three credits. A bonus multiplier operates in a similar manner, except that when you play the maximum number of credits allowed by the slot machine (e.g., max coin) and hit a jackpot, such as three 7's, the awarded credits are a greater multiplier than the multiple of credits played. For example, one credit may pay 1,000 credits, two credits may pay 2,000 credits, but three credits pays 10,000 credits, not 3,000 credits.

Some electronic pull tab machines have a multiplier feature. However, the multiplier feature works in a different way than slot machine multiplier features. Different deals are assigned to different multipliers. That is, there is a first deal for single credits (1×), a second deal for double (2×) credits, and a third deal for triple (3×) credits. Thus, if a patron plays 1× and then decides next to play 3×, the electronic pull tab for the 3× is not the next pull tab in the 1× deal, but instead is the next pull tab in the 3× deal. If the patron subsequently decides to play another 1× (and no other patron has played in between), then the patron receives the next pull tab from the 1× deal. One disadvantage of this scheme is that multiple deals must always be available to use the multiplier feature, thereby increasing the expense and complexity of the process.

Bingo can also be played with a multiplier concept. The bingo operator will sell bingo cards in different denominations, such $1.00 cards and $5.00 cards. A bingo winner playing a $5.00 card will be awarded five times the award amount than a bingo winner playing a $1.00 card.

A "buy-a-pay" feature is also provided on some slot machines. In buy-a-pay, each credit buys additional payouts. Consider, for example, a slot machine that makes payouts only for a combination of three cherries, three bars or three sevens, with the three sevens being the largest payout. If the patron plays one credit, a payout is given only for three cherries and there is no payout for three bars or three sevens. If two credits are played, a payout is given for three cherries or three bars and there is no payout for three sevens. If three credits are played, a payout is given for three cherries, three bars, or three sevens. No buy-a-pay feature exists with conventional pull tab tickets because the cost and prize amount of such tickets are both fixed.

Lottery tickets may also be selected and dispensed in a similar manner as pull tabs, using finite sets of outcomes for a fixed number of lottery tickets. Other forms of ticket-based games of chance implemented using the "deal" concept are also known in the art, such as scratch-off ticket games. Such tickets are also conventionally sold for a fixed cost with fixed prize amounts.

Gaming patrons are constantly seeking new forms of entertainment, and particularly new forms of entertainment that have familiar elements. The present invention fulfills this need by providing tickets (both pull tab and generic tickets)

which have conventional play elements in combination with new ways to play and redeem the tickets.

BRIEF SUMMARY OF THE INVENTION

Preprinted game tickets, such as pull tab tickets, are dispensed from a vending machine. Instead of having a fixed cost and a fixed prize amount, the game tickets may be purchased at different bet levels and credit values, both of which change the cost and prize amount. Buy-a-pay payments are also provided to buy additional symbol combinations.

BRIEF DESCRIPTION OF THE DRAWINGS

The above summary, as well as the following detailed description of a preferred embodiment of the invention, will be better understood when read in conjunction with the following drawings. For the purpose of illustrating the invention, the drawings show embodiments that are presently preferred. It should be understood that the invention is not limited to the precise arrangements and instrumentalities shown. In the drawings:

FIG. 3 shows sample tab results generated by a deal algorithm which are used to create tickets to be dispensed in accordance with one preferred embodiment of the present invention.

FIG. 5 shows the dispensed status of the pull tabs in FIG. 2.

FIG. 7 is a win table for a buy-a-pay embodiment of the present invention.

DETAILED DESCRIPTION OF THE INVENTION

Figure 1:
FIGURE 1 (PRIOR ART)
FIG. 1 show prior art single-ply pull tab tickets.

Certain terminology is used herein for convenience only and is not to be taken as a limitation on the present invention. In the drawings, the same reference letters are employed for designating the same elements throughout the several figures.

I. Multi-Bet Tickets Using Multiplier Payments

In a first embodiment of the present invention, a ticket which is normally played at a fixed denomination can be played for multiples of the fixed denomination. If the ticket is a winner, then the prize or award is a corresponding multiple of the award amount. The award amount is also referred to herein as the "predetermined base award amount."

Consider the following example: A pull tab machine is set to play a denomination of \$0.25, also referred to herein as a "ticket denomination". A patron can choose from multiple bet options, such as one credit (\$0.25), two credits (\$0.50), or three credits (\$0.75). If the pull tab is a winner, the award amount is multiplied by the number of credits bet. If a patron bets two credits and wins an award amount of five credits, the patron would win \$2.50 (0.25×2 credits played×5). The game results (i.e., whether a ticket is a winner and the amount of winning credits) are always predetermined based on the contents of preprinted tickets. However, the actual value of a winning ticket will depend upon the chosen multiple of the ticket denomination. The awarded multiple of the predetermined base award amount is preferably directly proportional to the multiple of the ticket denomination paid by the patron for the ticket (e.g., betting two credits results in a doubling of the base award amount). In this manner, the overall payout ratio of a deal of tickets should remain generally constant regardless of the multiples that are played. However, if maintaining a constant payout ratio is not necessary, non-proportional ratios may be used in a manner similar to the max bet feature of slot machines (e.g., betting three credits results in 5× multiple of the base award amount).

The chosen multiple times the ticket denomination is the "total wager amount." The total wager amount is representative of credits. That is, a patron may select a certain amount of credits, but the credits are ultimately translated into a wager amount. The patron is typically aware of the relationship between the credits and the wager amount represented by the credits.

At least some of the tickets played for different indicated multiples of the ticket denomination are from the same deal of tickets. That is, a ticket that is played for one credit may be drawn from the same deal of tickets as a ticket played for two or three credits. Stated another way, the deal from which a pull tab ticket is derived is not determined by the total wager amount. This is in contrast to the prior art scheme discussed above wherein the pull tab ticket may come from different deals depending upon the value of the ticket (e.g., 1×, 2×, 3×). In one preferred embodiment, the tickets being dispensed at any one time from the vending machine are associated with a single deal of tickets which may include one or more reels, sheets or stacks of tickets loaded into a pull tab machine. In contrast to the prior art described above in electronic pull tab machines that have a multiplier feature, a ticket played for one credit is drawn from a first deal, a ticket played for two credits is drawn from a second deal, and a ticket played for three credits is drawn from a third deal. The present invention thus does not require multiple deals to be used for implementing a multiplier feature, thereby reducing the cost and complexity of the process.

In an alternative embodiment of the present invention, the patron may select the ticket denomination and a constant ratio is maintained between the ticket denomination and the predetermined base award amount of the winning tickets. In the example described above, the pull tab machine is set to play a denomination of \$0.25. In the alternative embodiment, the patron can select other ticket denominations, such as \$1.00 or a customized amount. The ticket denomination still represents one credit. Thus, if a patron selects \$1.00 as the ticket denomination, the patron can still choose from multiple bet options, such as one credit (\$1.00), two credits (\$2.00), or three credits (\$3.00). If the pull tab is a winner, the award amount is still multiplied by the number of credits bet. Thus, if a patron bets two credits and wins an award amount of five credits, the patron would win \$10.00 (1.00×2 credits played×5).

A pull tab machine for implementing the present invention may be similar to the machines described in U.S. Pat. Nos. 5,941,771 and 5,348,299 or the Lucky Tab II machine, with the additional features shown in FIG. 2 described below. The pull tab machines may dispense single-ply or two-ply tickets.

FIG. 3 shows sample tab results generated by a deal algorithm which are used to create tickets to be dispensed. FIG. 3 shows a deal of 10 pull tabs. An actual deal may contain the results for generating 750,000 or more pull tabs which can be used to create 100 rolls of single-ply pull tabs, each having 7,500 pull tabs. In this example, each pull tab has three tabs or windows. (In single-ply pull tabs, the tabs or windows are not covered.)

Figure 2:
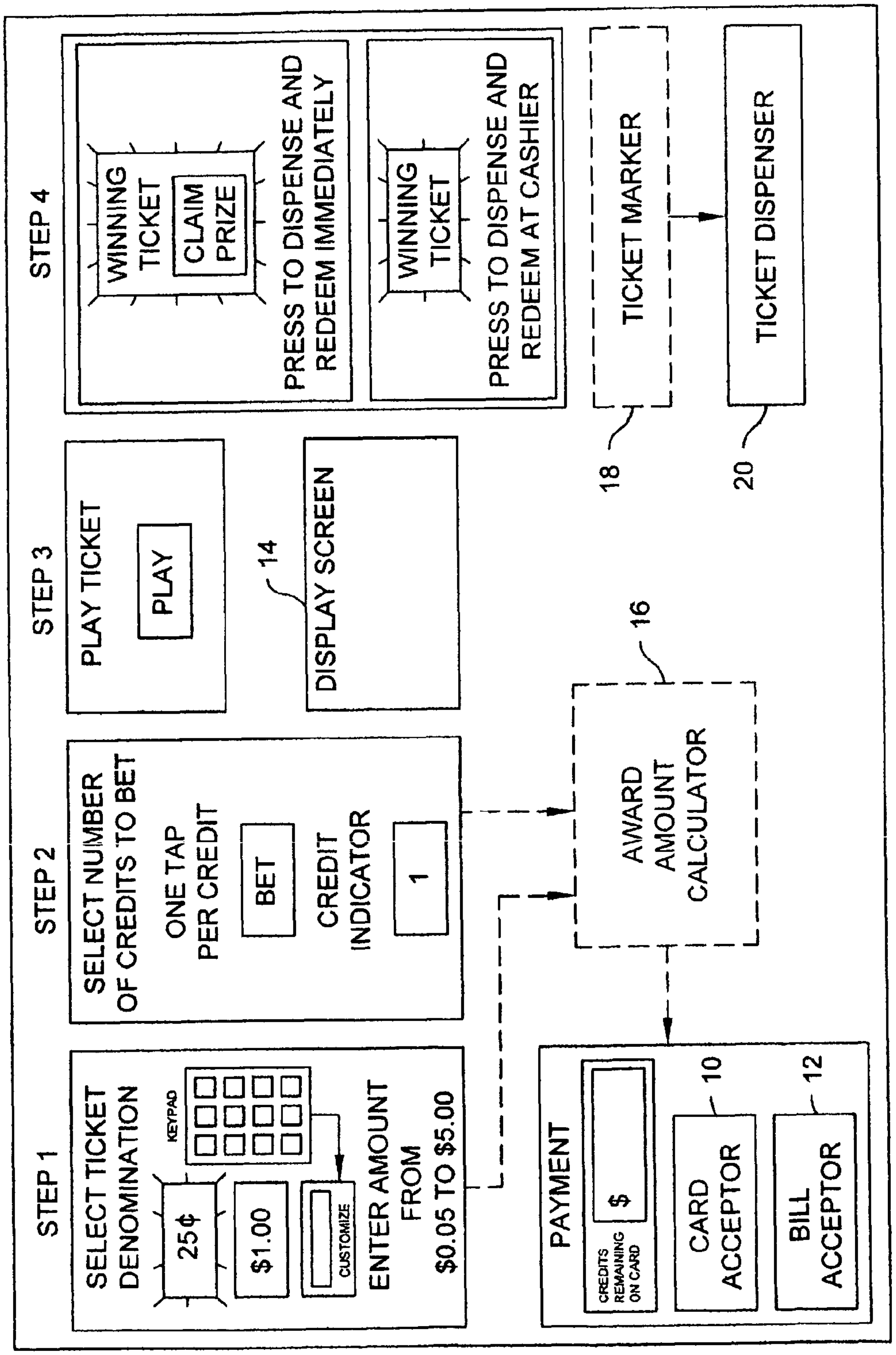
FIG. 2 shows selected elements on the face of a pull tab vending machine in accordance with one preferred embodiment of the present invention.

FIG. 2 shows selected elements on the face of a pull tab machine, as well as hidden elements (shown with dashed lines). To initiate ticket dispensing, a patron inserts a card into card acceptor 10. The card may be a stored value card which maintains a stored value amount in electronic format on the card, such as in a mag stripe. Alternatively, the card may have only account identification information and the card reader may be in communication with a remote database of account information. If the card or the account associated with the card has a zero balance, the patron inserts money into a bill acceptor 12 to charge up the card or the account with credits. Each credit is associated with a fixed dollar value (e.g., 1 credit=$0.25 as a default value). The patron is now ready to dispense tickets as follows:

1. If the option is available, the patron first selects the credit value if the default value is not desired (STEP 1). The number of available credits remaining on the card is adjusted based on the credit value.
2. The patron taps the BET button 1-3 times to select the number of credits to be played. (The fourth tap cycles back to "1."). If the credit value is 0.25, then 1 tap=0.25, 2 taps=0.50 and 3 taps=0.75. (STEP 2) The value of 1-3 represents the "multiple" or "bet level."
3. The Play Ticket button is pushed (STEP 3) and the total wager amount is subtracted from the card or from the account associated with the card.
4. The bar code of the ticket is read and is used to generate the display in a conventional manner. If the ticket is a winner, the WINNING TICKET button(s) lights up or a similar type of indicator is provided to the patron. (STEP 4). The display screen 14 will also show the results in electronic form in a manner similar to the display screens in U.S. Pat. Nos. 5,941,771 and 5,348,299, or in the Lucky Tab II machine.
5. If the ticket is a winner, the amount of the winning ticket (in dollars or credits) is calculated using award amount calculator 16.
6. The fact that the ticket was dispensed and the amount of winning ticket is recorded in a remote database that contains an electronic record of the entire deal of tickets previously loaded into the pull tab machine.

In one alternative embodiment of the present invention shown in STEP 4, the patron may either redeem the winning ticket immediately by having the winning dollar amount (in equivalent credits) immediately added to the card or to the account associated with the card, or the patron may defer immediate redemption. In both instances, the ticket is dispensed. If the ticket is immediately redeemed, a record of the redemption is made at a remote database and the ticket is preferably marked or defaced in some manner by a ticket marker 18 as it is being dispensed by dispenser 20 to indicate to the patron and cashiers that it was redeemed. The ticket is also preferably marked in some manner to indicate its value. In prior art ticket dispensers, such as pull tab machines, the value of a winning ticket is always fixed and is often printed directly on the ticket, and thus there is no need to make such a marking. However, when using the present invention, the value of a winning ticket is not known from the face of the ticket since it depends upon the multiple that is bet in STEP 2, and the credit value in STEP 1 if that amount is selectable by the patron. Accordingly, an indicia may be printed on the dispensed ticket so that the patron and cashier can immediately recognize the winning amount. Of course, when redeeming the ticket at a cashier, the bar code is still read and used to verify that the ticket is a winner. The indicia may be used to check the winning amount stored in the database since the database has a field that stores the number of credits played when the ticket was dispensed. The indicia may be a printed amount of the ticket value in dollars or credits, or it may be marks, holes or the like that indicate the number of credits played (e.g., 1, 2 or 3 marks depending upon whether 1, 2 or 3 credits were played). If the ticket denomination is patron-selectable, then the indicia would also indicate that value. In sum, the ticket marker 18 may cause some form of an indicator to appear on the dispensed ticket. Some ways of indicating include, but are not limited to, printing/marking, stamping, cutting, and embossing. To summarize, the ticket marker 18 may be used to indicate the number of credits played as well as to mark redeemed tickets.

Figure 4:
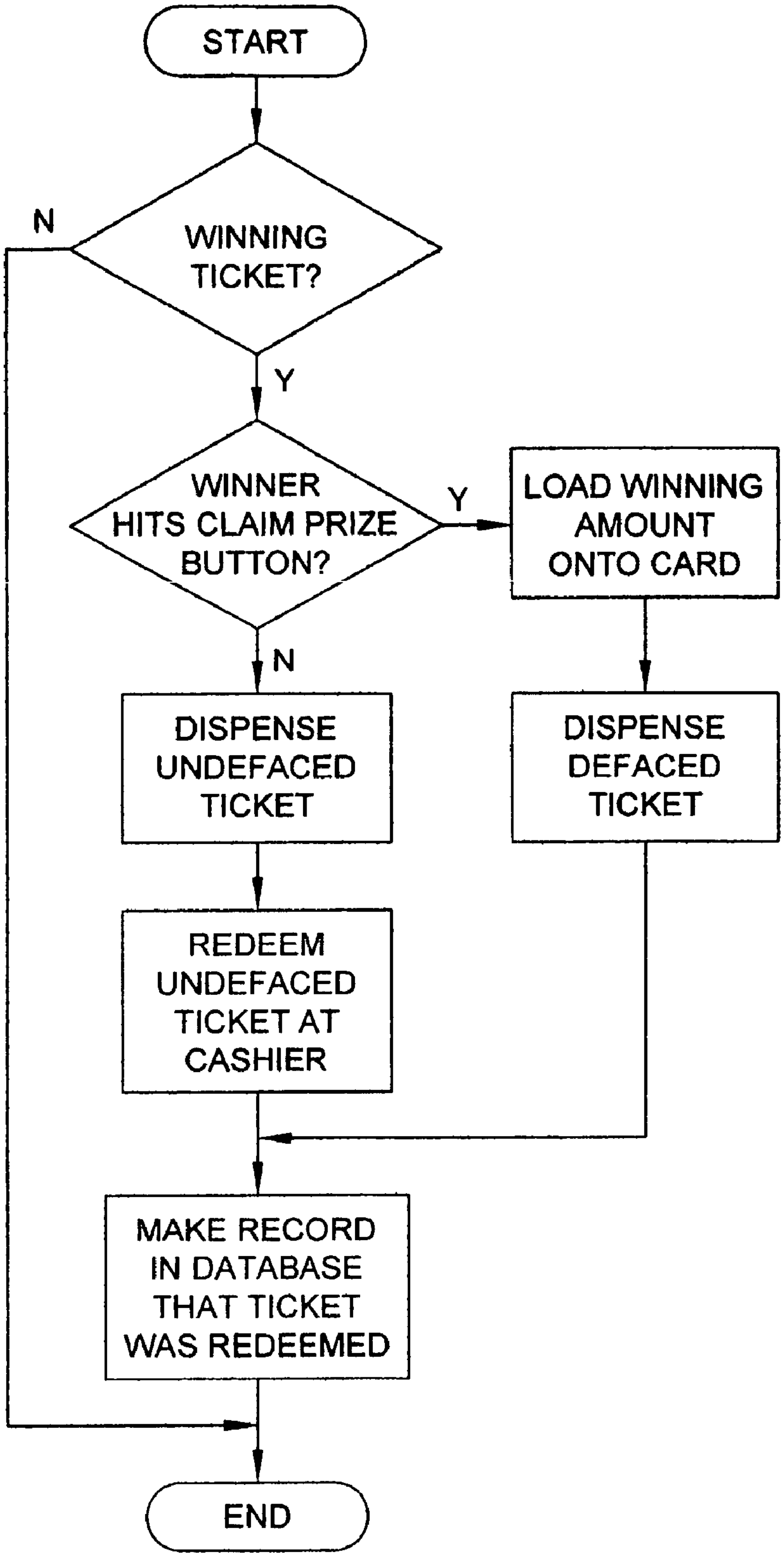
FIG. 4 is a flowchart of a dispensing/redeeming/defacing process in accordance with one preferred embodiment of the present invention.

FIG. 4 is a self-explanatory flowchart of the dispensing/redeeming/defacing portion of the process described above wherein the patron has the option of redeeming the ticket upon dispensing or at a later point in time at a cashier station.

FIG. 5 shows the redemption status of the pull tabs in FIG. 2 as maintained in an electronic record of a remote database. In an alternative embodiment of the present invention, the redemption status may further indicate whether the redemption occurred at the vending machine or at a cashier station.

Figure 6:
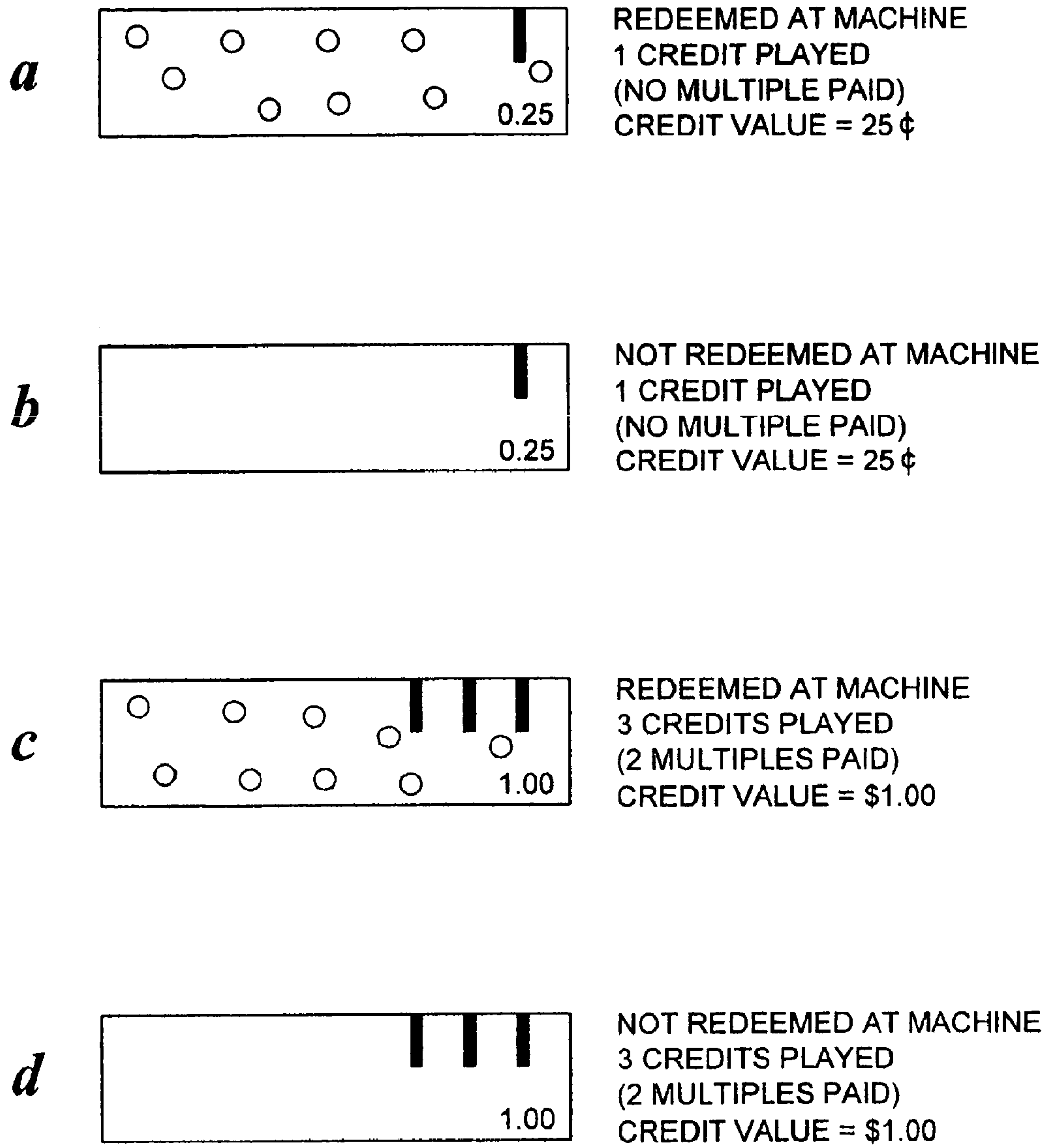
FIG. 6 shows examples of the front of dispensed tickets in accordance with one preferred embodiment of the present invention.

FIG. 6 shows examples of the front of dispensed tickets having the above-described indicia thereon, where appropriate. The ticket contents which appear in FIG. 1 are not shown on the tickets in FIG. 6. The circles in tickets a and c are hole punches.

The present invention preferably uses a completely random algorithm for generating each deal of ticket results which are used to create the tickets to be dispensed. Conventional deal generators for creating pull tab results do not use completely random algorithms. Instead, special algorithms are used to deliberately prevent long streaks of consecutive losing tickets from occurring and/or to prevent a close bunch of winning tickets from occurring (e.g., back to back jackpots are not allowed). This practice encourages greater play from patrons who have a string of losing tickets since such patrons will be more likely to continue playing if it is known that there is a higher probability of a winning ticket occurring after a string of all losing tickets than after a string of some winning and some losing tickets. In a conventional deal of pull tab tickets, the overall payout percentage is always be fixed. Thus, decisions by patrons to continue playing or to stop playing after winning or losing a certain number of tickets will not affect the overall payout. The overall payout percentage is the total amount of prize money for all winning tickets in a deal of tickets divided by the total face value cost of the tickets. A typical payout percentage is 92%.

If the conventional deal algorithms are used in the present invention, the possibility exists that the overall payout percentage could be increased by deliberate patron actions. For example, if a patron has a string of losing tickets, the percentage likelihood that a winning ticket will appear soon increases when using a conventional deal algorithm. This might cause the patron to increase the credit value and/or credits played on subsequent tickets so that the monetary value of a winning ticket would be greater than expected based on the patron's input of money wagered in a ticket buying session. Likewise, a patron who just received a winning ticket might react by prematurely stopping play or by reducing the credit value and/or credits played on subsequent tickets. Again, the net result would be that the amount wagered vs. the amount won for the patron session would not fall within an expected statistical range. The cumulative effect of many patrons having ratios outside of the expected statistical range would ultimately cause the overall payout percentage to increase, perhaps to a percentage that exceeds 100%. To prevent this scenario from occurring, a completely random algorithm is used for generating each deal of ticket results which are used to create the tickets to be dispensed. The completely random algorithm removes the potential for manipulating the outcome of individual patron sessions by strategically varying credit value or credits played, or by varying the length of the play session in response to whether one or more winning tickets were received. When using a completely random deal, the patron cannot increase the odds of winning by varying the credit value and/or credits played, or by buying more or less tickets than the patron's original intent. Thus, the overall payout percentage should remain the same for a sufficiently large deal of tickets. That is, while some patrons may bet more than the average amount and thus will win more than the average amount, an equal number of patrons will bet less than the average amount and will thus win less than the average amount.

II. Multi-Bet Tickets Using Buy-a-Pay Payments

In a second embodiment of the present invention, rather than increasing the size of the award with each credit bet, additional ways to win are added with each credit bet. All game results are preprinted but whether a particular ticket is a winner depends in part on whether extra credits are bet.

FIG. 7 shows a sample win table for buy-a-pay pull tab tickets which would preferably be displayed on the vending machine. If only one credit is played, a ticket will be a winner if it has three identical symbols of type 1. If a second credit is played, a ticket will be a winner if it has three identical symbols of type 1 or 2. If a third credit is played, a ticket will be a winner if it has three identical symbols of type 1, 2 or 3. The payouts for winning tickets are also fixed for the three types of symbols at 5, 20 and 100 credits, respectively, for a base credit value. The credits correspond to known monetary values in the same manner as described above in the first embodiment.

In an alternative embodiment, the patron can also select a credit value that is greater or less than a base credit value, as described above in the first embodiment. For example, if the base credit value is $0.25, and the patron establishes a base credit value of $1.00, then the credits won will be multiplied by four.

III. Multi-Bet Tickets Using Multiplier Payments and Buy-a-Pay Payments

In a third embodiment of the present invention, multiplier payments and buy-a-pay payments are both used. For example, a first multiple of the ticket denomination allows the patron to buy a chance for a higher award amount (e.g., doubling the bet doubles the award amount of a winning ticket), and a second multiple of the ticket denomination allows the patron to buy one or more additional combinations (e.g., tripling the bet also doubles the award amount of a winning ticket, but adds one or more additional combinations of symbols that could result in a winning ticket).

IV. Additional Considerations

The present invention is described in the context of pull tab tickets. However, the scope of the present invention also includes generic tickets, such as instant game tickets (e.g., scratch off lottery tickets). These tickets are also conventionally preprinted in fixed denominations based on electronic deals and cannot be played in any of the modes described above.

The tickets described above typically include a bar code which is captured upon dispensing and is used in one or more of the following ways:

1. If the bar code contains an encoding of the ticket contents, the bar code is decoded and the ticket contents are presented on the display screen of the vending machine.
2. If the bar code does not contain the ticket results but instead contains an identification number, the number is used as a pointer to locate the ticket results in a remote database. The ticket results are then relayed back to the vending machine for display.

FIG. 2 shows a payment method that uses a card and bill acceptor combination. In alternative embodiments, a cash only payment system may be used, or a ticket-based system may be used similar to the EZ Pay™ Ticket System, available from International Game Technology, Reno, Nev. The EZ Pay system is generally described in U.S. Pat. No. 6,676,522 (Rowe et al.), incorporated herein by reference. U.S. Pat. No. 6,048,269 (Burns et al.), incorporated herein by reference, also shows a cashless/coinless slot machine system similar to the EZ Pay system and which may be used as a payment system for the present invention.

The tickets used in the present invention may be dispensed from a continuous roll or sheet, or they may be printed on separate sheets of printed media and dispensed from a stack.

In an alternative embodiment of the multiplier payment scheme or buy-a-pay scheme of the present invention, the tickets may be manually dispensed by a clerk, the patron would inform the clerk of the desired bet level (multiple) to be played (e.g., 1×, 2×, 3×), and the clerk would mark the ticket accordingly with their value (e.g., 1×, 2×, 3×). If the ticket is a winner, the marking would be used to determine the ticket value.

The present invention may be implemented with any combination of hardware and software. If implemented as a computer-implemented apparatus, the present invention is implemented using means for performing all of the steps and functions described above.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention.

What is claimed is:

1. A method of vending tickets preprinted with game content and associated with a deal of tickets that includes at least some predetermined winning tickets, each ticket having a base ticket denomination, and each winning ticket having a predetermined base award amount, for each vended ticket the method comprising:

(a) receiving an indication from a patron for inputting into a vending machine of a total wager amount for payment of a ticket, the total wager amount being equal to the base ticket denomination and a multiple of the base ticket denomination that the patron selects for the ticket;

(b) recording the multiple of the base ticket denomination selected by the patron in a database;

(c) dispensing the ticket from the vending machine; and (d) calculating using a calculator an award amount for a winning ticket by multiplying the predetermined base award amount by the recorded multiple of the base ticket denomination obtained from the database, and awarding the calculated award amount to the patron, wherein the deal from which the tickets are derived is not determined by the total wager amount.

2. The method of claim 1 further comprising:

(e) the patron establishing the base ticket denomination used in step (a).

3. The method of claim 2 wherein a constant ratio is maintained between the base ticket denomination and the predetermined base award amount of the winning tickets.

4. The method of claim 1 further comprising:

(e) the vending machine indicating on only selected winning dispensed tickets an indicia of the total wager amount, the indicia being used to determine the value of the winning ticket.

5. The method of claim 4 wherein the selected winning dispensed tickets are those in which the patron redeems at the vending machine.

6. The method of claim 1 further comprising:

(e) the patron indicating to the vending machine upon dispensing of a winning ticket whether to redeem the winning ticket at the vending machine or at a remote site.

7. The method of claim 6 further comprising:

(f) the vending machine visually defacing the winning ticket upon dispensing only if a patron redeems the winning ticket at the vending machine.

8. The method of claim 1 wherein the tickets being dispensed at any one time from the vending machine are associated with a single deal of tickets.

9. The method of claim 1 further comprising:

(e) inserting into the vending machine a card that allows for access to an account, wherein the indicated total wager amount is deducted from the account.

10. The method of claim 1 further comprising:

(e) using a game deal generator to generate the deal of ticket results, the deal generator using a completely random algorithm for generating the deal; and (f) using the deal of ticket results to create the tickets to be dispensed.

11. The method of claim 1 wherein winning tickets do not have winning amounts printed thereon.

12. The method of claim 1 wherein the selected multiple has a default value of one.

13. The method of claim 1 wherein the award amount for a winning ticket is calculated and awarded by a cashier, the method further comprising:

(e) the cashier electronically retrieving the recorded multiple of the base ticket denomination from a database to assist in calculating the award amount.

14. The method of claim 1 further comprising:

(e) providing an electronic record of each ticket in the deal, the electronic record including the recorded multiple of the base ticket denomination selected by the patron, wherein the electronic record is used by a cashier at a remote site if a patron requests that the cashier redeem a dispensed winning ticket.

15. The method of claim 1 wherein the ticket is an instant game lottery ticket.

16. A method of vending pull tab tickets preprinted with game content and associated with a deal of pull tab tickets that includes at least some predetermined winning pull tab tickets, each pull tab ticket having a base ticket denomination, each winning pull tab ticket having a predetermined base award amount, for each vended ticket the method comprising:

(a) receiving an indication from a patron for inputting into a vending machine of a total wager amount for payment of a pull tab ticket, the total wager amount being equal to the base ticket denomination and a multiple of the base ticket denomination that the patron selects for the pull tab ticket;

(b) recording the multiple of the pull tab base ticket denomination selected by the patron in a database;

(c) dispensing the pull tab ticket from the vending machine; and (d) calculating using a calculator an award amount for a winning pull tab ticket by multiplying the predetermined base award amount by the recorded multiple of the pull tab base ticket denomination obtained from the database, and awarding the calculated award amount to the patron, wherein the deal from which the pull tab tickets are derived is not determined by the total wager amount.

17. The method of claim 16 further comprising:

(e) the patron establishing the ticket denomination used in step (a).

18. The method of claim 17 wherein a constant ratio is maintained between the ticket denomination and the predetermined base award amount of the winning pull tab tickets.

19. The method of claim 16 further comprising:

(e) the vending machine indicating on only selected winning dispensed pull tab tickets an indicia of the total wager amount, the indicia being used to determine the value of the winning pull tab ticket.

20. The method of claim 19 wherein the selected winning dispensed pull tab tickets are those in which the patron redeems at the vending machine.

21. The method of claim 16 further comprising:

(e) the patron indicating to the vending machine upon dispensing of a winning ticket whether to redeem the winning ticket at the vending machine or at a remote site.

22. The method of claim 21 further comprising:

(f) the vending machine visually defacing the winning pull tab ticket upon dispensing only if a patron redeems the winning pull tab ticket at the vending machine.

23. The method of claim 16 wherein the pull tab tickets being dispensed at any one time from the vending machine are associated with a single deal of pull tab tickets.

24. The method of claim 16 further comprising:

(e) inserting into the vending machine a card that allows for access to an account, wherein the indicated total wager amount is deducted from the account.

25. The method of claim 16 further comprising:

(e) using a game deal generator to generate the deal of pull tab ticket results, the deal generator using a completely random algorithm for generating the deal; and (f) using the deal of pull tab ticket results to create the pull tab tickets to be dispensed.

26. The method of claim 16 wherein winning pull tab tickets do not have winning amounts printed thereon.

27. The method of claim 16 wherein the pull tab tickets are two-ply pull tab tickets.

28. The method of claim 16 wherein the pull tab tickets are single-ply tickets having at least one game region with game content similar to the content of a pull tab game, but with no pull tab structure.

29. The method of claim 16 wherein the selected multiple has a default value of one.

30. The method of claim 16 wherein the award amount for a winning ticket is calculated and awarded by a cashier, the method further comprising:

(e) the cashier electronically retrieving the recorded multiple of the base ticket denomination from a database to assist in calculating the award amount.

31. The method of claim 16 further comprising:

(e) providing an electronic record of each ticket in the deal, the electronic record including the recorded multiple of the base ticket denomination selected by the patron, wherein the electronic record is used by a cashier at a remote site if a patron requests that the cashier redeem a dispensed winning ticket.

32. The method of claim 16 wherein the ticket is an instant game lottery ticket.

33. A method of vending tickets preprinted with game content and associated with a deal of tickets, each ticket having a base ticket denomination, each winning ticket having (i) a predetermined base award amount, (ii) a predetermined winning combination associated with the base ticket denomination, and (iii) one or more additional predetermined winning combinations associated with different multiples of the base ticket denomination, the predetermined winning combinations being preprinted on the tickets, for each vended ticket the method comprising:

(a) receiving an indication from a patron for inputting into a vending machine of a total wager amount for payment of a ticket, the total wager amount including:

(i) the base ticket denomination, (ii) a first multiple of the base ticket denomination that the patron selects for the ticket, and (iii) a second multiple of the base ticket denomination that the patron selects for the ticket so as to buy one or more additional predetermined winning combinations that are preprinted on the ticket;

(b) recording the first multiple of the base ticket denomination selected by the patron in a database;

(c) dispensing the ticket from the vending machine; and (d) calculating using a calculator an award amount for a winning ticket by multiplying the predetermined base award amount by the recorded first multiple of the base ticket denomination obtained from the database, and awarding the calculated award amount to the patron, wherein the deal from which the tickets are derived is not determined by the total wager amount, and wherein the presence of the predetermined winning combination associated with the base ticket denomination or one or more of the additional predetermined winning combinations, if bought, indicates a winning ticket.

34. The method of claim 33 further comprising:

(e) the patron indicating to the vending machine upon dispensing of a winning ticket whether to redeem the winning ticket at the vending machine or at a remote site.

35. The method of claim 34 further comprising:

(f) the vending machine visually defacing the winning ticket upon dispensing only if a patron redeems the winning ticket at the vending machine.

36. The method of claim 33 further comprising:

(e) using a game deal generator to generate a deal of ticket results, the deal generator using a completely random algorithm for generating the deal; and (f) using the deal of ticket results to create the tickets to be dispensed.

37. The method of claim 33 wherein the multiple is a whole number and corresponds to the number of additional combinations that are bought.

38. The method of claim 33 wherein the tickets being dispensed at any one time from the vending machine are associated with a single deal of tickets.

39. The method of claim 33 wherein the tickets are pull tab tickets.

40. The method of claim 33 wherein the selected first multiple has a default value of one.

41. The method of claim 33 wherein the award amount for a winning ticket is calculated and awarded by a cashier, the method further comprising:

(e) the cashier electronically retrieving the recorded multiple of the base ticket denomination from a database to assist in calculating the award amount.

42. The method of claim 33 further comprising:

(e) providing an electronic record of each ticket in the deal, the electronic record including the recorded multiple of the base ticket denomination selected by the patron, wherein the electronic record is used by a cashier at a remote site if a patron requests that the cashier redeem a dispensed winning ticket.

43. The method of claim 33 wherein the ticket is an instant game lottery ticket.

* * * * *